(12) United States Patent
Min et al.

(10) Patent No.: US 12,541,481 B2
(45) Date of Patent: Feb. 3, 2026

(54) ELECTRONIC DEVICE FOR SETTING OPERATING MODE OF INTERFACE ON BASIS OF PERFORMANCE INFORMATION ABOUT EXTERNAL ELECTRONIC DEVICE, AND ELECTRONIC DEVICE OPERATING METHOD

(71) Applicant: Samsung Electronics Co., Ltd., Suwon-si (KR)

(72) Inventors: Sungbin Min, Suwon-si (KR); Hyunkee Min, Suwon-si (KR); Taeyong Kim, Suwon-si (KR); Chounjong Nam, Suwon-si (KR); Changmok Yang, Suwon-si (KR); Sunkee Lee, Suwon-si (KR); Eonji Lee, Suwon-si (KR); Mincheol Jeong, Suwon-si (KR); Junyeop Jung, Suwon-si (KR); Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/430,034

(22) Filed: Feb. 1, 2024

(65) Prior Publication Data
US 2024/0193119 A1    Jun. 13, 2024

Related U.S. Application Data

(63) Continuation of application No. PCT/KR2022/004399, filed on Mar. 29, 2022.

(30) Foreign Application Priority Data

Aug. 5, 2021   (KR) ........................ 10-2021-0102896

(51) Int. Cl.
*G06F 13/42*    (2006.01)
*G06F 11/14*    (2006.01)

(52) U.S. Cl.
CPC ...... *G06F 13/4282* (2013.01); *G06F 11/1415* (2013.01); *G06F 2213/0026* (2013.01)

(58) Field of Classification Search
CPC ............. G06F 13/4282; G06F 11/1415; G06F 2213/0026
See application file for complete search history.

(56) References Cited

U.S. PATENT DOCUMENTS 9,480,096 B1    10/2016    Lee et al.
10,558,605 B2    2/2020    Hong
(Continued)

FOREIGN PATENT DOCUMENTS

JP    6222314 B2    11/2017
KR    100914420 B1    8/2009
(Continued)

OTHER PUBLICATIONS

International Search Report for PCT/KR2022/004399 mailed Jun. 23, 2022, 7 pages.
(Continued)

*Primary Examiner* — Henry Tsai
*Assistant Examiner* — Harry Z Wang
(74) *Attorney, Agent, or Firm* — Nixon & Vanderhye, P.C.

(57) ABSTRACT

With respect to an electronic device and an electronic device operating method, according to various embodiments, the electronic device comprises: a communication module including a communication circuit and at least one processor, comprising processing circuitry, configured to support short-range wireless communication; and at least one application processor, comprising processing circuitry, electri-
(Continued)

cally connected to the communication module through an interface supporting a plurality of operating modes, wherein at least one processor, individually and/or collectively, can be configured to: select one operating mode from among the plurality of operating modes based on capability information about the external electronic device, received from the external electronic device; and transmit data to the application processor through the selected operating mode and/or receive, through the selected interface, data transmitted by the application processor, and the capability information about the external electronic device can be configured to be received from the external electronic device before completion of the establishment of the short-range wireless communication.

20 Claims, 7 Drawing Sheets

(56) References Cited

U.S. PATENT DOCUMENTS

| | | | |
|---|---|---|---|
| 11,032,859 B2 | 6/2021 | Min | |
| 2005/0197017 A1 | 9/2005 | Chou | |
| 2005/0271072 A1 | 12/2005 | Anderson | |
| 2012/0169480 A1* | 7/2012 | Jantunen | G01S 13/758 |
| | | | 340/10.51 |
| 2013/0282937 A1* | 10/2013 | Chapman | H02J 7/342 |
| | | | 710/104 |
| 2017/0177528 A1 | 6/2017 | Harriman | |
| 2018/0288758 A1 | 10/2018 | Cordeiro | |
| 2018/0293200 A1* | 10/2018 | Hong | G06F 13/4282 |
| 2018/0343618 A1 | 11/2018 | Park | |
| 2019/0121417 A1 | 4/2019 | Schneider et al. | |
| 2020/0278733 A1 | 9/2020 | Li et al. | |
| 2020/0295906 A1 | 9/2020 | An | |
| 2021/0021976 A1* | 1/2021 | Kim | H04W 76/10 |

FOREIGN PATENT DOCUMENTS

| | | |
|---|---|---|
| KR | 20180113827 A | 10/2018 |
| KR | 20190043017 A | 4/2019 |
| KR | 20210009129 A | 1/2021 |
| WO | 2017/035062 | 3/2017 |

OTHER PUBLICATIONS

Written Opinion of the ISA for PCT/KR2022/004399 mailed Jun. 23, 2022, 5 pages.

Extended Search Report dated Oct. 14, 2024 in European Patent Application No. 22853220.6.

Office Action dated Oct. 23, 2025 in Korean Patent Application No. 10-2021-0102896 and English-language translation.

* cited by examiner

ELECTRONIC DEVICE FOR SETTING OPERATING MODE OF INTERFACE ON BASIS OF PERFORMANCE INFORMATION ABOUT EXTERNAL ELECTRONIC DEVICE, AND ELECTRONIC DEVICE OPERATING METHOD

CROSS-REFERENCE TO RELATED APPLICATIONS

This application is a continuation of International Application No. PCT/KR2022/004399 designating the United States, filed on Mar. 29, 2022, in the Korean Intellectual Property Receiving Office and claiming priority to Korean Patent Application No. 10-2021-0102896, filed on Aug. 5, 2021, in the Korean Intellectual Property Office, the disclosures of each of which are incorporated by reference herein in their entireties.

BACKGROUND

Field

The disclosure relates to an electronic device and a method of operating the electronic device and, for example, to a technology for configuring an operation mode of an interface between an application processor and a communication module, based on capability information of an external electronic device.

Description of Related Art

With the supply of various electronic devices, a speed of wireless communication which can be used by the various electronic devices has been improved. Among wireless communication recently supported by electronic devices, IEEE 802.11 WLAN (or Wi-Fi) is the standard for implementing high-speed wireless connections of various electronic devices. Initially implemented Wi-Fi may support a maximum of transmission speed of 1 to 9 Mbps, but Wi-Fi 6 technology (or IEEE 802.11 ax) may support a maximum of transmission speed of about 10 Gbps.

The electronic device may support various services (for example, a UHD video streaming service, an augmented reality (AR) service, a virtual reality (VR) service, or a mixed reality (MR) service) using relatively large data through wireless communication supporting a high transmission speed and also support various other services.

An electronic device may generate a channel for exchanging data with an external electronic device (or an access point (AP)) and transmit or receive data through the generated channel.

The electronic device may include an interface for transmitting and/or receiving data between an application processor and a communication module. The interface may support a plurality of operation modes having different maximum data rates. However, the difference between a maximum data rate of a channel generated between the electronic device and the external electronic device and a maximum data rate supported by an operation mode of the interface may be large. In this case, a data transmission rate (or reception rate) may deteriorate and/or power consumption may increase.

SUMMARY

An electronic device according to various example embodiments of the disclosure includes: a communication module including a communication circuit configured to support short-range wireless communication and at least one processor, comprising processing circuitry, and at least one application processor, comprising processing circuitry, electrically connected to the communication module through an interface configured to support a plurality of operation modes, wherein at least one processor, individually and/or collectively, is configured to: select one operation mode from among the plurality of operation modes, based on capability information of an external electronic device received from the external electronic device and transmit data to at least one application processor through the selected operation mode or receive data transmitted by the application processor through the selected interface, wherein the capability information of the external electronic device is received from the external electronic device before establishment of the short-range wireless communication is completed.

A method of operating an electronic device according to various example embodiments of the disclosure may include: selecting one operation mode from among a plurality of operation modes supported by an interface between an application processor and a communication module, based on capability information of an external electronic device received from the external electronic device and transmitting data to the application processor through an interface operating in the selected operation mode or receiving data transmitted by the application processor through the interface, wherein the capability information of the external electronic device is received from the external electronic device before establishment of short-range wireless communication is completed.

An electronic device and a method of operating the electronic device according to various example embodiments of the disclosure can select (or determine) an operation mode of an interface, based on capability information of an external electronic device received during a process of generating a channel to be connected to the external electronic device through short-range wireless communication and transmit data through the interface having the activated selected operation mode. The selected operation mode may be an operation mode supporting a data rate higher than a maximum date rate of a channel between the external electronic device and the electronic device. Accordingly, the electronic device can prevent and/or reduce a bottleneck phenomenon that may be generated by operating in an operation mode supporting a data rate lower than the maximum data rate of the channel.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
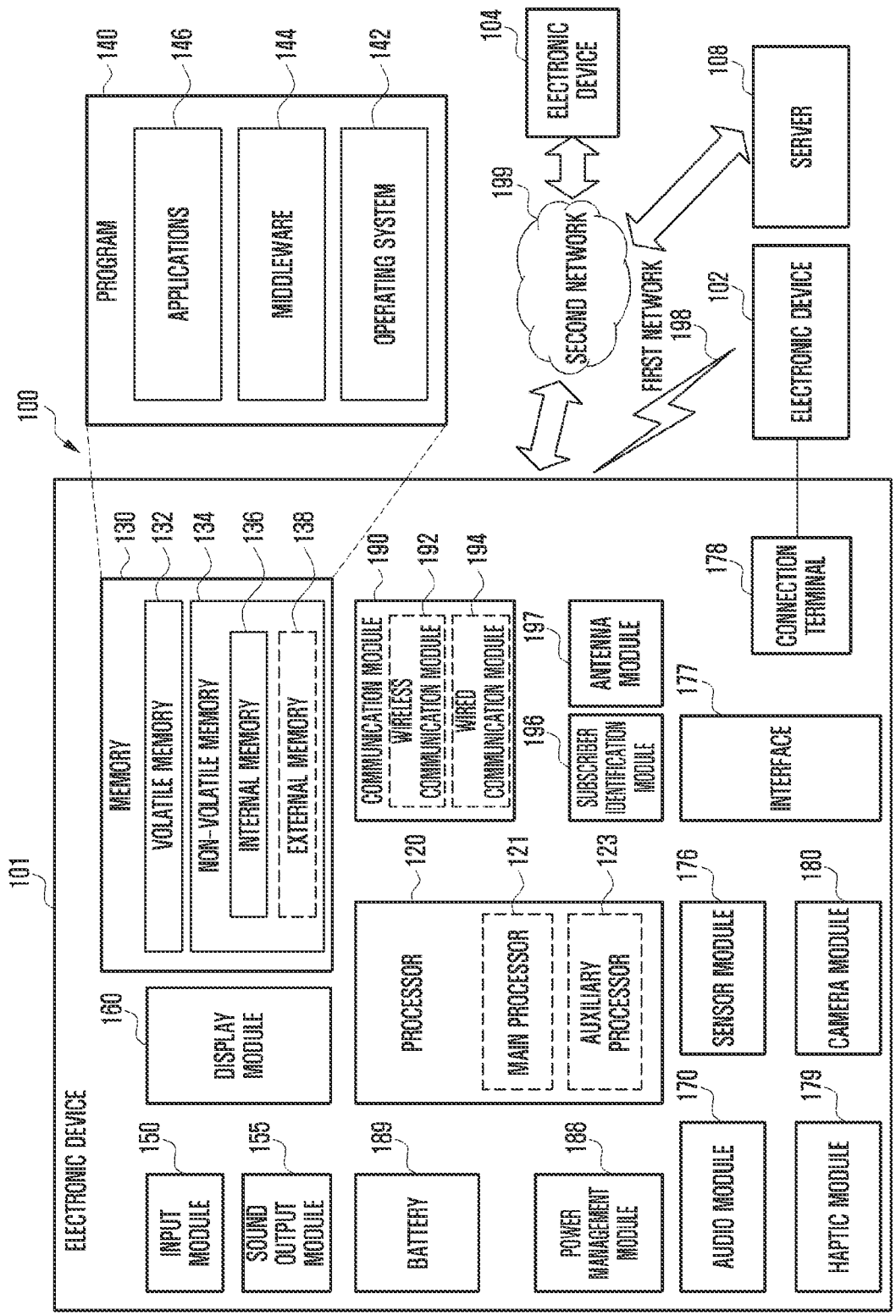
FIG. 1 is a block diagram illustrating an example electronic device in a network environment according to various.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
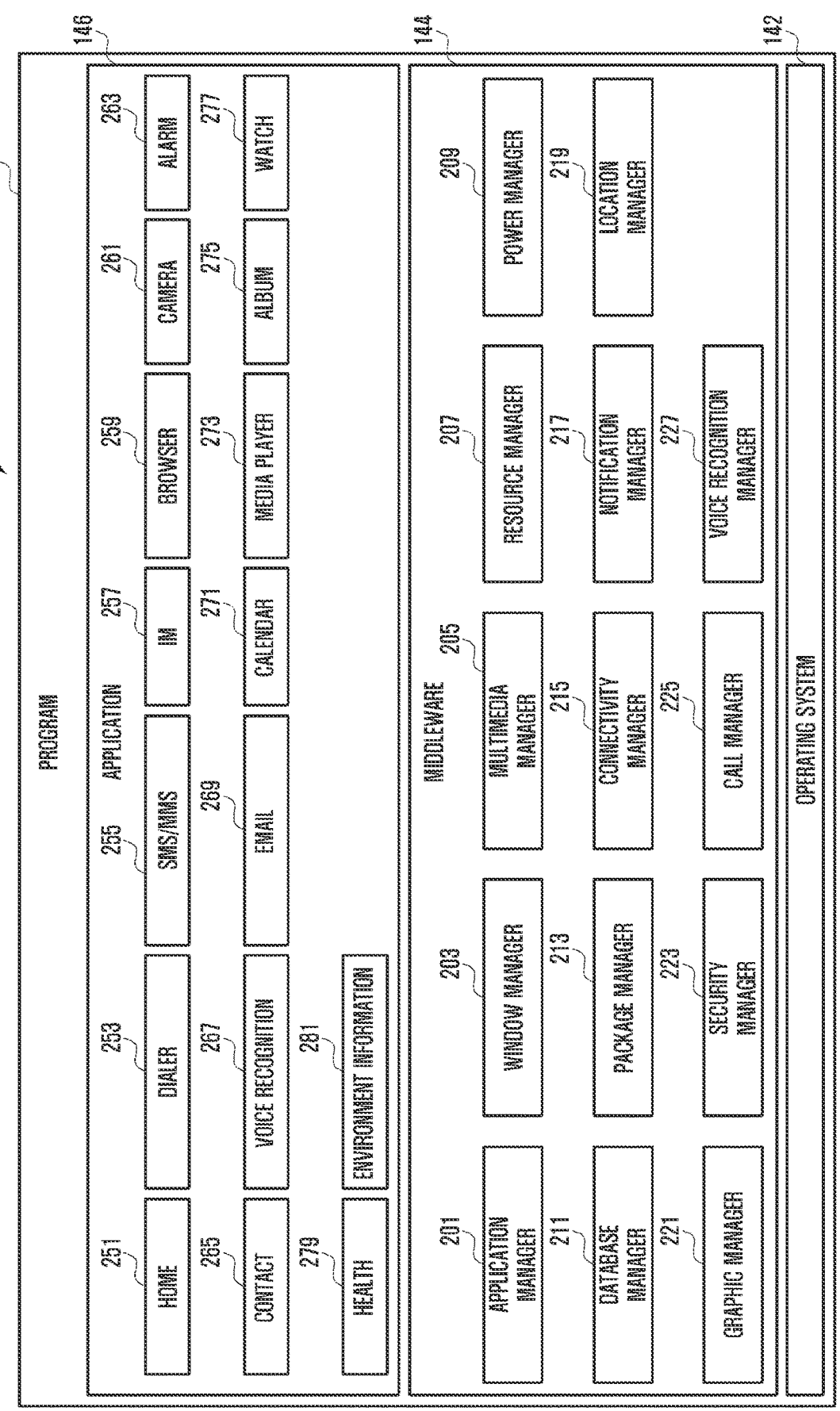
FIG. 2 is a block diagram illustrating an example configuration of a program according to various embodiments.

FIG. 2 is a block diagram 200 illustrating an example configuration of the program 140 according to various embodiments. According to an embodiment, the program 140 may include an operating system (OS) 142 to control one or more resources of the electronic device 101, middleware 144, or an application 146 executable in the OS 142. The OS 142 may include, for example, and without limitation, Android™, iOS™, Windows™, Symbian™, Tizen™, Bada™, or the like. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
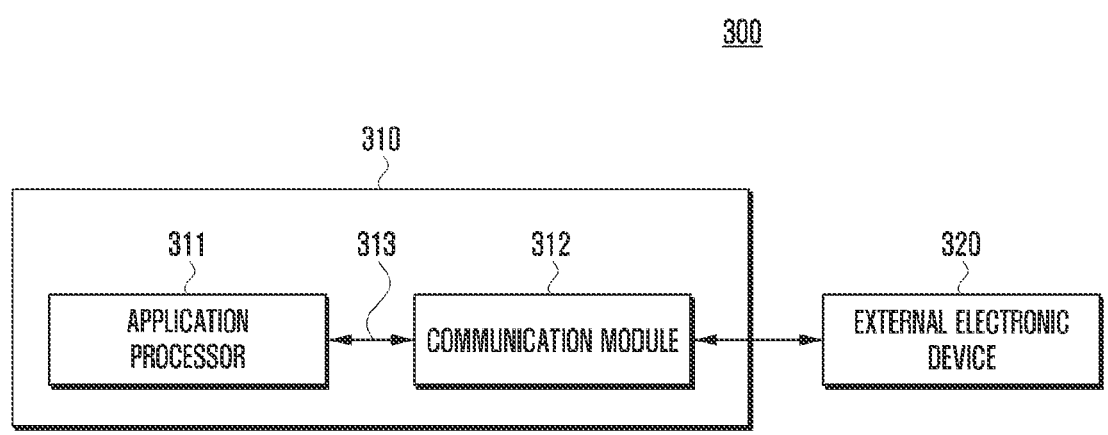
FIG. 3 is a block diagram illustrating an example configuration in which an electronic device is connected to an external electronic device through short-range wireless communication according to various embodiments.

FIG. 3 is a block diagram illustrating an example configuration in which an electronic device is connected to an external electronic device through short-range wireless communication according to various embodiments.

Referring to FIG. 3, a WLAN system 300 may include an electronic device 310 and/or an external electronic device 320. According to an embodiment, the electronic device 310 may perform wireless communication with the external electronic device 320 through short-range wireless communication. The short-range wireless communication may refer, for example, to various communication schemes which can be supported by both the electronic device 310 and/or the external electronic device 320. For example, the short-range wireless communication may be Wi-Fi. The external electronic device 320 is at least one electronic device 310 located within a communication radius of the WLAN system 300 and may serve as a base station which provides wireless communication. For example, the external electronic device 320 may include an access point (AP) of IEEE 802.11. The electronic device 310 may include a station (STA) of IEEE 802.11.

Short-range wireless communication used by the electronic device 310 and/or the external electronic device 320 to exchange data may use various frequency bands including a first frequency band (for example, 2.4 GHZ), a second frequency band (for example, 5 GHZ), a third frequency band (for example, 6 GHZ), and/or a fourth frequency band (for example, 7 GHZ). The electronic device 310 and/or the external electronic device 320 may establish a channel included in one frequency band among a plurality of frequency bands and exchange data using the established channel.

The electronic device 310 and/or the external electronic device 320 may support short-range wireless communication of various generations. For example, the generation of short-range wireless communication supported by the electronic device 310 and/or the external electronic device 320 may be as shown in [Table 1] below.

TABLE 1

| Generation | Wi-Fi 4 | Wi-Fi 5 | Wi-Fi 6 | Wi-Fi 6E | Wi-Fi 7 |
| --- | --- | --- | --- | --- | --- |
| Maximum data rate | 1.2 Gbps | 3.5 Gbps | 9.6 Gbps | | 46 Gbps |
| Frequency band | 2.4 GHz, 5 GHz | 5 GHz | 2.4 GHz, 5 GHz | 6 GHz | 1~7.25 GHz |
| Channel bandwidth | 20, 40 MHz | 20, 40, 80, 80 + 80, 160 MHz | 20, 40, 80, 80 + 80, 160 MHz | | up to 320 MHz |
| Modulation coding scheme (MCS) | 64 QAM OFDM | 256 QAM OFDM | 1024 QAM OFDMA | | 4096 QAM OFDMA |
| Multiple input multiple output (MIMO) | 4 × 4 MIMO | 4 × 4 MIMO, DL MU-MIMO | 8 × 8 UL/DL MU-MIMO | | 16 × 16 MU-MIMO |

As a portion of the process for the connection to the external electronic device 320, the electronic device 310 may transmit a channel generation request message (for example, a beacon message related to short-range wireless communication or a probe response message corresponding to a response message corresponding to a probe message transmitted by the external electronic device 320) to the external electronic device 320. The external electronic device 320 may transmit a message including information related to short-range wireless communication supportable by the external electronic device 320 to the electronic device 310 in response to the channel generation request message. The information related to the short-range wireless communication may include information on generations of short-range wireless communication (for example, Wi-Fi 4, Wi-Fi 5, Wi-Fi 6, Wi-Fi6e, or Wi-Fi 7) supported by the external electronic device 320, channel bandwidth information, information indicating a maximum data rate, and/or information indicating a modulation and coding scheme (MCS). The electronic device 310 may configure a channel to be connected to the external electronic device 320, based on information related to short-range wireless communication transmitted by the external electronic device 320.

The electronic device 310 may configure an interface 313 between a processor (e.g., including processing circuitry) 311 (for example, the processor 120 of FIG. 1) and a communication module (e.g., including communication circuitry) 312 (for example, the wireless communication module 192 of FIG. 1) during a process of establishing a channel. The interface may include peripheral component interconnect express (PCIe). The PCIe may be an interface having a series structure for data exchanges between elements of the electronic device 310 (for example, the application processor 311 and/or the communication module 312). The communication module 312 may process data (for example, demodulate data according to a predetermined MCS and/or check whether there is an error in data) received through the channel established by the external electronic device 320 and transmit the processed data to the application processor 311 through the interface 313. The application processor 311 may transmit data, desired to be transmitted, to the communication module 312 through the interface 313. Alternatively, the application processor 311 may transmit a control signal for controlling the communication module 312 through the interface 313.

The electronic device 310 may support the interface 313 which supports various modes. According to an embodiment, the interface 313 may support a plurality of operation modes following the PCIe standard. The operations modes supported by the interface 313 may be operation modes having different maximum data rates. For example, the interface 313 may support operation modes according to PCIe generations. The operation modes supported by the interface 313 implemented in the electronic device 310 are shown in [Table 2] below.

TABLE 2

| Operation mode | First operation mode | Second operation mode | Third operation mode | Fourth operation mode | Fifth operation mode |
|---|---|---|---|---|---|
| PCIe generation | PCIe 1.0 (first generation) | PCIe 2.0 (second generation) | PCIe 3.0 (third generation) | PCIe 4.0 (fourth generation) | PCIe 5.0 (fifth generation) |
| Maximum data rate | 2 Gbps | 4 Gbps | 7.88 Gbps | 16 Gbps | 32 Gbps |

The interface 313 may support a plurality of operation modes following the PCIe standard. Referring to [Table 2], the interface 313 may support a first operation mode having the maximum data rate of 2 Gbps, a second operation mode having the maximum data rate of 4 Gbps, a third operation mode having the maximum data rate of 7.88 Gbps, a fourth operation mode having the maximum data rate of 16 Gbps, and/or a fifth operation mode having the maximum data rate of 32 Gbps. The interface 313 may operate in one operation mode among the plurality of operation modes, based on the control of the application processor 311 and/or the communication module 312.

According to an embodiment, the electronic device 310 may transmit and/or receive data to have a specific data rate while being connected to the external electronic device 320 through the channel. When the electronic device 310 transmits and/or receives data through the interface 311 operating in an operation mode (for example, the first operation mode) having a data rate (for example, 2 Gbps) lower than the specific data rate (for example, 3 Gbps), a portion of the data may be not be transmitted and/or received within a predetermined time, which is called a bottleneck phenomenon. When the bottleneck phenomenon is generated, a data transmission rate or reception rate may deteriorate and also unnecessary power consumption may be made. When the electronic device 310 transmits and/or receives data through the interface 313 operating in an operation mode (for example, the fourth operation mode) having a data rate (for example, 7.88 Gbps) relatively higher than the specific data rate (for example, 3 Gbps), unnecessary power consumption may be generated compared to the situation in which data is transmitted and/or received through the interface 313 operating in an operation mode (for example, the third operation mode) having a relatively low data rate (for example, 4 Gbps).

Hereinafter, various example embodiments for preventing and/or reducing the bottleneck phenomenon and reducing unnecessary power consumption by transmitting and/or receiving data through the appropriate interface 313, based on capability information of the external electronic device 320 will be described in greater detail.

Figure 4:
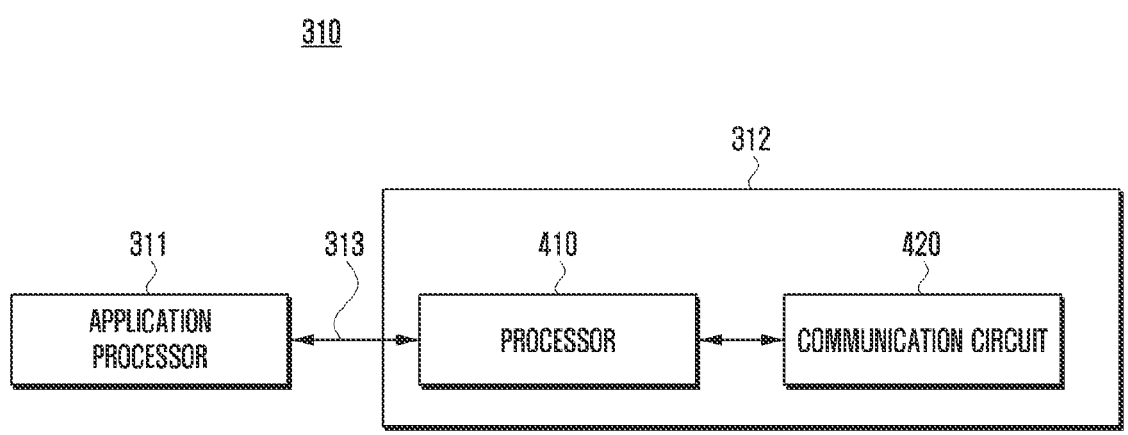
FIG. 4 is a block diagram illustrating an example configuration of an electronic device according to various embodiments.

FIG. 4 is a block diagram illustrating an example configuration of an electronic device according to various embodiments.

According to various embodiments of the disclosure, an electronic device (for example, the electronic device 310 of FIG. 3) may include the application processor (e.g., including processing circuitry) 311 (for example, the processor 120 of FIG. 1), the communication module (e.g., including communication circuitry) 312 (for example, the wireless communication module 192 of FIG. 1), and/or the interface (e.g., including various circuitry) 313.

The application processor 311 may include various processing circuitry and/or multiple processors. For example, as used herein, including the claims, the term "processor", "application processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The application processor 311 may, for example, receive data transmitted by an external electronic device (for example, the external electronic device 320 of FIG. 3) through the communication module 320 and perform various operations using the received data. The application processor 311 may transmit data to the communication module 320 through the interface 313 in order to transmit the data to the external electronic device 320.

The interface 313 is an element implemented between the application processor 311 and the communication module 312, and may transmit data transmitted by the application processor 311 to the communication module 312 and transmit data transmitted by the communication module 312 to the application processor 311. The interface may include peripheral component interconnect express (PCIe). The PCIe may be an interface having a series structure for data exchanges between elements of the electronic device 310 (for example, the application processor 311 and/or the communication module 312).

The application processor 311 and/or the processor 410 may support the interface 313 supporting various modes. The interface 313 may support a plurality of operation modes following the PCIe standard. The operations modes supported by the interface 313 may be operation modes having different maximum data rates. For example, the interface 313 may support operation modes according to PCIe generations. The operation modes supported by the interface 313 implemented in the electronic device 310 are shown in [Table 2] above. The interface 313 may support a plurality of operation modes following the PCIe standard. Referring to [Table 2], the interface 313 may support a first operation mode having the maximum data rate of 2 Gbps, a second operation mode having the maximum data rate of 4 Gbps, a third operation mode having the maximum data rate of 7.88 Gbps, a fourth operation mode having the maximum data rate of 16 Gbps, and/or a fifth operation mode having the maximum data rate of 32 Gbps. The interface 313 may operate in one operation mode among a plurality of operation modes, based on the control of the application processor 311 and/or the processor 410.

The communication module 312 may include various communication circuitry and be connected to the application processor 312 through the interface 313 and may exchange data. The communication module 312 may include various elements to support short-range wireless communication (for example, Wi-Fi). According to an embodiment, the communication module 312 may include a processor 410 and/or a communication circuit 420.

The communication circuit 420 may include various circuit structures used for modulating and/or demodulating a signal within the electronic device 310. For example, the communication circuit 420 may modulate a signal in a baseband into a signal in a radio frequency (RF) band to output the signal through an antenna (not shown) or demodulate the signal in the RF band received through the antenna into the signal in the baseband, and transmit the signal to the processor 410.

According to various embodiments of the disclosure, the processor 410 may receive data transmitted by the application processor 311 through the interface 313 and perform various operations for transmitting the received data to the external electronic device 320. The processor 410 may also be referred to as a communication processor (or a communication processor) included in the communication module 312. According to an embodiment, the processor 410 may perform channel coding based on data transmitted by the application processor 311, identify whether there is an error in at least some of the data transmitted by the external electronic device 320, or perform an operation of recovering the error (for example, hybrid auto repeat request (HARQ)) when the error occurs.

According to various embodiments of the disclosure, the processor 410 may receive capability information of the external electronic device 320 as a portion of the operation for establishing the channel to exchange data with the external electronic device 320. The processor 410 may transmit a channel generation request message (for example, a beacon message related to short-range wireless communication or a probe response message corresponding to a response message corresponding to a probe message transmitted by the external electronic device 320) to the external electronic device 320. The external electronic device 320 may receive the channel establishment request message from the electronic device 310 and transmit the response message including capability information of the external electronic device 320 to the electronic device 310.

The capability information of the external electronic device 320 may be capability information related to short-range wireless communication supported by the external electronic device 320. For example, the capability information of the external electronic device 320 may include information on generations of short-range wireless communication (for example, Wi-Fi 4, Wi-Fi 5, Wi-Fi 6, Wi-Fi6e, or Wi-Fi 7) supported by the external electronic device 320, channel bandwidth information, information indicating a maximum data rate, and/or information indicating a modulation and coding scheme (MCS).

The processor 410 may receive capability information of the external electronic device 320 and a channel to be connected with the external electronic device 320, based on the capability information of the external electronic device 320. When performing short-range wireless communication with the external electronic device 320, the processor 410 may determine configurations (for example, a frequency band, a channel, a maximum date rate, and/or a modulation and coding scheme (MCS) to perform short-range wireless communication) to be used for short-range wireless communication. According to an embodiment, the processor 410 may determine configurations to be used for short-range wireless communication, based on capability information of short-range wireless communication which can be supported by the electronic device 310 and capability information of the external electronic device 320. The configurations to be used for short-range wireless communication may include a frequency band, a channel, a maximum data rate, and/or a modulation and coding scheme which can be supported by both the electronic device 310 and the external electronic device 320. According to an embodiment, the processor 410 may receive the configurations to be used by the external electronic device 320 for short-range wireless communication determined based on the capability information of the electronic device 310 and the capability information of the external electronic device 320.

The processor 410 may control the communication circuit 420, based on the determined configurations to be sued for short-range wireless communication. According to an embodiment, the processor 410 may control the communication circuit 420 by activating specific elements (for example, an amplifier which amplifies a signal in a specific frequency band and/or a filter which filters a signal in a specific frequency band) included in the communication circuit 420 in order to transmit or receive data through a specific frequency band among the determined configurations to be used for short-range wireless communication.

The processor 410 may control the interface 313, based on the determined configurations to be used for short-range wireless communication. The processor 410 may identify a maximum data rate included in the determined configurations and select an operation mode in which the interface 313 operates based on the maximum date rate.

According to an embodiment, the processor 410 may select an operation mode supporting a data rate higher than the maximum data rate included in the determined configurations as the operation mode in which the interface 313 operates. For example, the processor 410 may select one operation mode from among the operation modes (for example, the second operation mode, the third operation mode, the fourth operation mode, and/or the fifth operation mode) supporting a data rate higher than a data rate (for example, 3.5 Gbps) included in the determined configurations as the operation mode in which the Interface 313 operates. According to an embodiment, the processor 410 may prevent and/or reduce the bottleneck phenomenon and reduce power consumption by selecting an operation mode (for example, the second operation mode) supporting a data rate higher than the data rate included in the determined configurations as the operation mode in which the interface 313 operates.

The processor 410 may control the interface 313 to operate the interface 313 in the selected operation mode in response to identification that the interface 313 operates in an operation mode different from the selected operation mode. The processor 410 may switch a state of the interface 313 from an active state (for example, L0, L0s, or L1) to a recovery state and control the interface 313 to change the operation mode in the recovery state. The recovery state may be a state temporarily switched to change the operation mode of the interface 313. After an authentication operation between the external electronic device 320 and the electronic device 310 is completed during the operation of establishing the channel between the external electronic device 320 and the electronic device 310, the processor 410 may change the operation mode of the interface 313. The processor 410 may perform various operations (for example, an association operation between the external electronic device 320 and the electronic device 310) for establishing the channel in response to completion of the change in the operation mode of the interface 313, and complete the channel establishment.

The processor 410 may support various wireless communication modes defined in short-range wireless communication. Various wireless communication modes may include, for example, and without limitation, a station (STA) mode in which the electronic device 310 receives or transmits data from or to various external electronic devices via the external electronic device 320, a peer-to-peer (P2P) mode (or a Wi-Fi direct mode) in which the electronic device 310 is directly connected to an external electronic device (for example, the external electronic device 102 of FIG. 1) and exchanges data, and/or a mobile hot-spot (MHS) mode in which the electronic device 310 serves as an access point (AP). In the state in which the electronic device 310 is connected to the external electronic device 320 through the STA mode), the electronic device 310 may be connected to another external electronic device (for example, the external electronic device 102 of FIG. 1) through another mode (for example, the P2P mode and/or the MHS mode) as various wireless communication modes are simultaneously supported.

During the connection with the external electronic device 320, the processor 410 may detect a connection with another external electronic device (for example, the external electronic device 102 of FIG. 1) through short-range wireless communication. The processor 410 may make a request for and receive capability information of the other external electronic device 102 according to detection of the connection with the other external electronic device 102 through short-range wireless communication. The capability information of the other external electronic device 102 may be capability information related to short-range wireless communication supported by the other external electronic device 102. For example, the capability information of the other external electronic device 102 may include information on generations of short-range wireless communication (for example, Wi-Fi 4, Wi-Fi 5, Wi-Fi 6, Wi-Fi6e, or Wi-Fi 7) supported by the other external electronic device 102, channel bandwidth information, information indicating a maximum data rate, and/or information indicating a modulation and coding scheme (MCS).

The processor 410 may receive the capability information of the other external electronic device 102 and establish a channel to be connected to the other external electronic device 102, based on the capability information of the other external electronic device 102. When performing short-range wireless communication with the other external electronic device 102, the processor 410 may determine configurations (for example, a frequency band, a channel, a maximum data rate, and/or a modulation and coding scheme (MCS) to perform short-range wireless communication) to be used for short-range wireless communication. According to an embodiment, the processor 410 may determine configuration to be used for short-range wireless communication, based on capability information of short-range wireless communication which can be supported by the electronic device 310 and the capability information of the other external electronic device 102. The configurations to be used for short-range wireless communication may include a frequency band, a channel, a maximum data rate, and/or a modulation and coding scheme which can be supported by both the electronic device 310 and the other external electronic device 102. According to an embodiment, the processor 410 may receive the determined configurations to be used by the other external electronic device 102 for short-range wireless communication, based on the capability information of the electronic device 310 and the capability information of the other external electronic device 102.

The processor 410 may control the interface 313, based on the determined configurations to be used for short-range wireless communication. The processor 410 may identify a maximum data rate included in the determined configurations and select an operation mode in which the interface 313 operates based on the maximum date rate.

The processor 410 may select an operation mode in which the interface 313 operates based on the capability information of the external electronic device 320 and the capability information of the other external electronic device 102. The processor 410 may select an operation mode supporting a data rate higher than a larger value between the maximum data rate of the channel connected between the external electronic device 320 and the electronic device 310 and the maximum data rate of the channel connected between the other external electronic device 102 and the electronic device 310 as the operation mode in which the interface 313 operates. For example, the processor 410 may select an operation mode (for example, the fourth operation mode or the fifth operation mode) supporting a data rate (for example, 16 Gbps or 32 GBps) higher than a larger value between the maximum data rate (for example, 3.5 Gbps) of the channel connected between the external electronic device 320 and the electronic device 310 and the maximum data rate (for example, 9.6 Gbps) of the channel connected between the other external electronic device 102 and the electronic device 310 as the operation mode in which the interface 313 operates. The processor 410 may prevent and/or reduce the bottleneck phenomenon and reduce power consumption by selecting an operation mode (for example, the fourth operation mode) having the lowest maximum data rate from among the operation modes supporting a data rate higher than the larger data rate as the operation mode in which the interface 313 operates.

Although the processor 410 of the communication module 312 controls the interface 313 in the above-described embodiments, the application processor 311 may also control the interface 313 in the above-described scheme.

The processor 410 may identify an activated operation mode of the interface 313 and determine configurations to be used for short-range wireless communication between the other external electronic device 102 and the electronic device 310, based on a maximum data rate corresponding to the activated operation mode. The configurations to be used for short-range wireless communication may include a frequency band, a channel, a maximum data rate, and/or a modulation and coding scheme which can be supported by both the electronic device 310 and the other external electronic device 102. The processor 410 may identify a maximum data rate (for example, 4 Gbps) of the currently activated operation mode (for example, the second operation mode) and generate a channel with the other external electronic device 102 using a short-range wireless communication scheme (for example, Wi-Fi 4 or Wi-Fi 5) supporting a maximum data rate lower than the identified maximum data rate.

Figure 5:
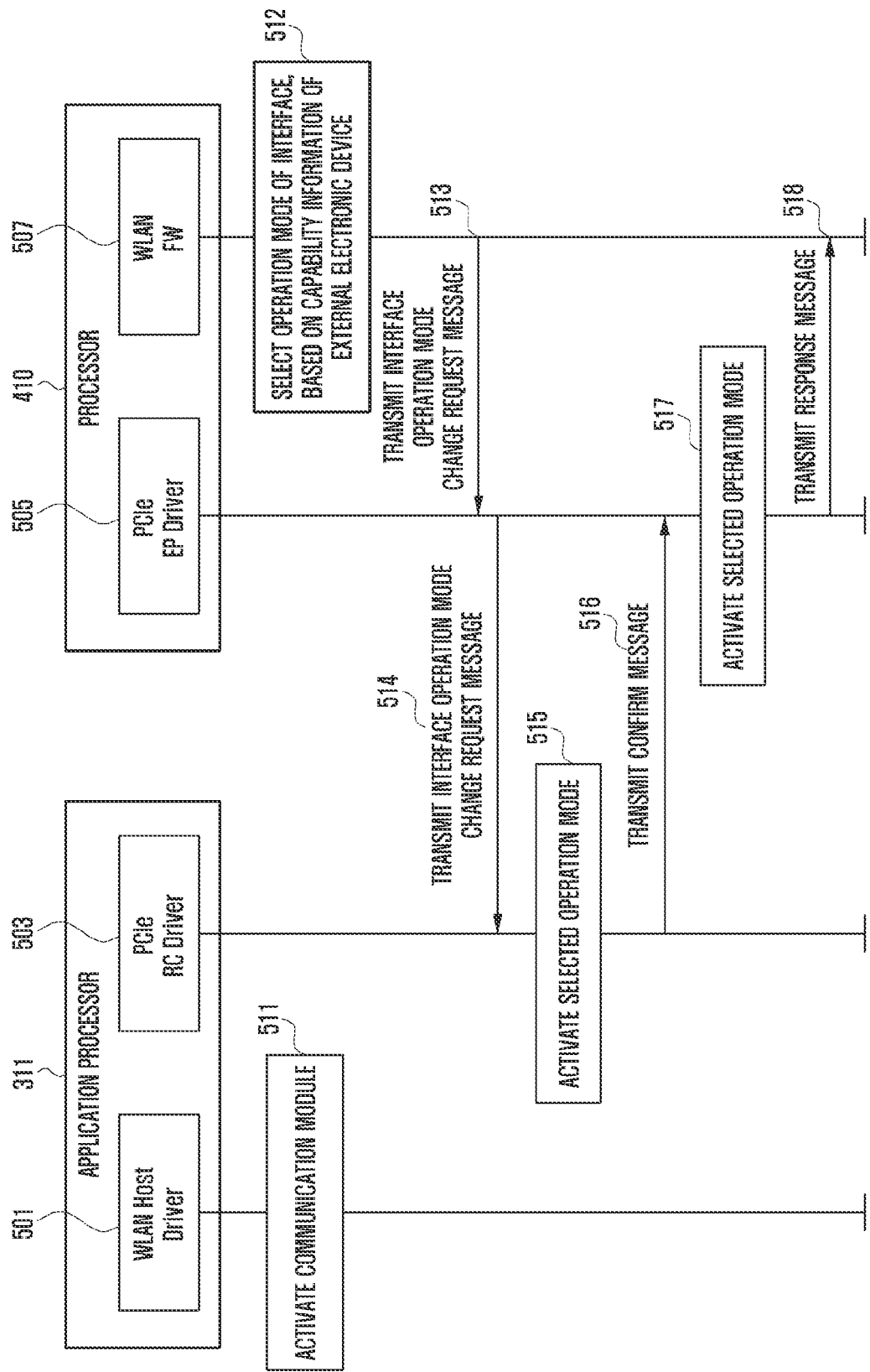
FIG. 5 is a signal flow diagram illustrating an example operation in which an electronic device connects an interface between an application processor and a communication module according to various embodiments.

FIG. 5 is a signal flow diagram illustrating example operations in which an electronic device connects an interface between an application processor and a communication module according to various embodiments.

An electronic device (for example, the electronic device 310 of FIG. 3) according to an embodiment may include the application processor 311 and the processor 410.

The application processor (for example, the application processor 311 of FIG. 4) may include a wireless LAN (WLAN) host driver 501 for controlling hardware components included in the communication module 312 and/or a PCIe route complex (RC) driver 503 for controlling an interface (for example, the interface 313 of FIG. 5).

The processor (for example, the processor 410 of FIG. 4) may include a PCIe end-point (EP) driver 505 for controlling the interface 313 and/or WLAN firmware (FW) 507 for processing a control signal transmitted by the application processor 311 and controlling hardware components included in the communication module 312 using the processing result.

The WLAN host driver 501 may activate the communication module (for example, the communication module 312 of FIG. 4) in response to satisfaction of a specific condition (for example, receiving a user input for activating short-range wireless communication, detecting a specific external electronic device (for example, the external electronic device 320 of FIG. 3), and/or identifying entry of the electronic device 310 into a specific location) in operation 511.

As a portion of the operation for activating the communication 312, the WLAN host driver 501 may transmit a signal indicating activation of the communication module 312 to the communication module 312 (or the processor 410) through the interface 313.

The processor 410 may perform an operation for activating the communication circuit (for example, the communication circuit 420 of FIG. 4) and making a connection with the external electronic device 320 in response to reception of the signal for activating the communication module 312 transmitted by the application processor 311 (or the WLAN host driver 501).

As a portion of the operation for establishing a channel to exchange data with the external electronic device 320, the processor 410 may receive capability information of the external electronic device 320. The processor 410 may transmit a channel establishment request message (for example, a beacon message related to short-range wireless communication or a probe response message corresponding to a response message corresponding to a probe message transmitted by the external electronic device 320) to the external electronic device 320. The external electronic device 320 may receive the channel establishment request message from the electronic device 310 and transmit the response message including capability information of the external electronic device 320 to the electronic device 310.

The capability information of the external electronic device 320 may be capability information related to short-range wireless communication supported by the external electronic device 320. For example, the capability information of the external electronic device 320 may include information on generations of short-range wireless communication (for example, Wi-Fi 4, Wi-Fi 5, Wi-Fi 6, Wi-Fi6e, or Wi-Fi 7) supported by the external electronic device 320, channel bandwidth information, information indicating a maximum data rate, and/or information indicating a modulation and coding scheme (MCS).

The WLAN FW 507 may receive capability information of the external electronic device 320 and establish a channel to be connected to the external electronic device 320, based on the capability information of the external electronic device 320. When performing short-range wireless communication with the external electronic device 320, the WLAN FW 507 may determine configurations (for example, a frequency band, a channel, a maximum data rate, and/or a modulation and coding scheme (MCS) to perform short-range wireless communication) to be used for short-range wireless communication. According to an embodiment, the WLAN FW 507 may determine the configurations to be used for short-range wireless communication, based on capability information of short-range wireless communication which can be supported by the electronic device 310 and capability information of the external electronic device 320. The configurations to be used for short-range wireless communication may include a frequency band, a channel, a maximum data rate, and/or a modulation and coding scheme which can be supported by both the electronic device 310 and the external electronic device 320.

The WLAN FW 507 may select (or determine) an operation mode of the interface 313, based on the capability information of the external electronic device 320 in operation 512.

The WLAN FW 507 may identify a maximum data rate included in the determined configurations and select an operation mode in which the interface 313 operates based on the maximum data rate.

The WLAN FW 507 may select an operation mode supporting a data rate higher than the maximum data rate included in the determined configurations as the operation mode in which the interface 313 operates. For example, the processor 410 may select one operation mode from among the operation modes (for example, the second operation mode, the third operation mode, the fourth operation mode, and/or the fifth operation mode) supporting a data rate higher than the maximum data rate (for example, 3.5 Gbps) included in the determined configurations as the operation mode in which the interface 313 operates. The WLAN FW 507 may select an operation mode (for example, the second operation mode) having the lowest maximum data rate from among the operation modes supporting a data rate higher than the maximum data rate included in the determined configurations as the operation mode in which the interface 313 operates.

The WLAN FW 507 may transmit a request message for changing the operation mode of the interface to the PCIe EP driver 505 in operation 513.

The request message for changing the operation mode of the interface may include information indicating the selected operation mode.

The PCIe EP driver 505 may transmit the request message for changing the operation mode of the interface to the PCIe RC driver 503 in operation 514.

The request message for changing the operation mode of the interface may include information indicating the selected operation mode and may be a message making a request for changing the operation mode to the selected operation mode.

The PCIe RC driver 503 may activate the selected operation mode in operation 515.

The PCIe RC driver 503 may activate the operation mode of the interface implemented in the application processor 311. The operation mode of the interface implemented in the processor 410 may be configured by the PCIe EP Driver 505.

The PCIe RC driver 503 may transmit a confirm message indicating activation of the selected operation mode to the PCIe EP driver 505 in response to completion of activation of the selected operation mode in operation 516.

The PCIe EP driver 505 may activate the selected operation mode in response to reception of the confirm message in operation 517.

The PCIe EP driver 505 may transmit a response message indicating activation of the selected operation mode to the WLAN FW 507 in response to activation of the selected operation mode in operation 518.

An electronic device (for example, the electronic device 310 of FIG. 4) according to various example embodiments of the disclosure may include: a communication module (for example, the communication module 312 of FIG. 4) including a communication circuit (for example, the communication circuit 420 of FIG. 4) configured to support short-range wireless communication and at least one processor, comprising processing circuitry (for example, the processor 410 of FIG. 4), an application processor comprising processing circuitry (for example, the application processor 311 of FIG. 4), electrically connected to the communication module (e.g., communication module 312) through an interface (for example, the interface 313 of FIG. 4) supporting a plurality of operation modes, wherein at least one processor, individually and/or collectively, may be configured to: select one operation mode from among the plurality of operation modes, based on capability information of an external electronic device (for example, the external electronic device 320 of FIG. 3) from the external electronic device (e.g., external device 320) and transmit data to the application processor through the selected operation mode or receive data transmitted by the application processor through the selected interface, wherein the capability information of the external electronic device may be received from the external electronic device before establishment of the short-range wireless communication is completed.

In the electronic device according to various example embodiments of the disclosure, the capability information of the external electronic device may include frequency band information of a channel related to the short-range wireless communication, data rate information related to data exchanged through the short-range wireless communication, and/or modulation and coding scheme (MCS) information related to the data.

In the electronic device according to various example embodiments of the disclosure, the capability information of the external electronic device may be included in a message received during a process of generating a channel between the external electronic device and the electronic device.

In the electronic device according to various example embodiments of the disclosure, at least one processor, individually and/or collectively, may be configured to select an operation mode of an interface corresponding to a data rate higher than a maximum data rate transmitted through the channel.

In the electronic device according to various example embodiments of the disclosure, at least one processor, individually and/or collectively, may be configured to: receive capability information of another external electronic device (for example, the electronic device 102 of FIG. 1) to be connected through the short-range wireless communication and select one operation mode from among the plurality of operation modes, based on the capability information of the external electronic device and the other external electronic device.

In the electronic device according to various example embodiments of the disclosure, at least one processor, individually and/or collectively, may be configured to select an operation mode supporting a data rate higher than a larger data rate between a maximum data rate of data transmitted by the external electronic device and a maximum data rate of data transmitted by the other external electronic device.

In the electronic device according to various example embodiments of the disclosure, at least one processor, individually and/or collectively, may be configured to activate the selected operation mode through a recovery state of the connected interface in response to identification that an operation of the interface is different from the selected operation mode.

In the electronic device according to various example embodiments of the disclosure, at least one processor, individually and/or collectively, may be configured to select one of channels supported by the external electronic device, based on a capability of an interface connected between the communication module and the application processor; and make a connection with the external electronic device through the selected channel.

In the electronic device according to various example embodiments of the disclosure, the interface may be a type of the interface including a peripheral component interconnect interface express (PCIe).

In the electronic device according to various example embodiments of the disclosure, at least one processor, individually and/or collectively, may be configured to complete a connection between the communication module and the application through the selected operation mode until a channel is generated.

Figure 6:
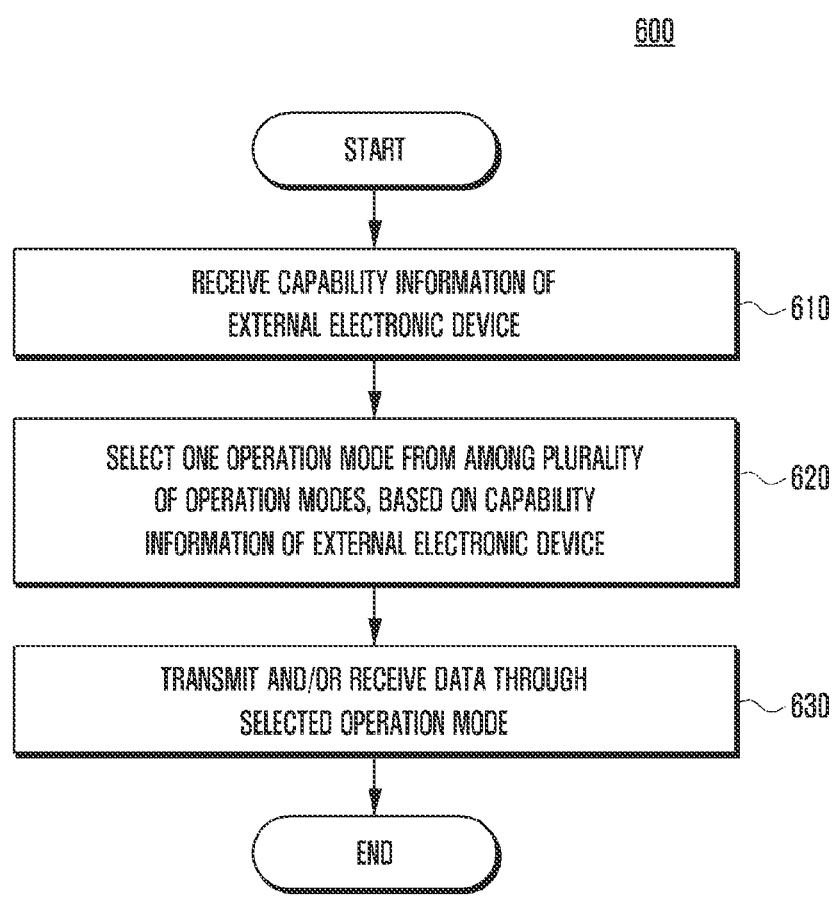
FIG. 6 is a flowchart illustrating an example method of operating an electronic device according to various embodiments.

FIG. 6 is a flowchart illustrating an example method of operating an electronic device according to various embodiments.

An electronic device (for example, the electronic device 310 of FIG. 4) may receive capability information of an external electronic device (for example, the external electronic device 320 of FIG. 3) in operation 610.

According to various embodiments of the disclosure, as a portion of the operation for establishing a channel to exchange data with the external electronic device 320, the electronic device 310 may receive capability information of the external electronic device 320. The electronic device 310 may transmit a channel generation request message (for example, a beacon message related to short-range wireless communication or a probe response message corresponding to a response message corresponding to a probe message transmitted by the external electronic device 320) to the external electronic device 320. The external electronic device 320 may receive the channel generation request message from the electronic device and transmit a response message including the capability information of the external electronic device 320 to the electronic device.

The capability information of the external electronic device 320 may include capability information related to short-range wireless communication supported by the external electronic device 320. For example, the capability information of the external electronic device 320 may include information on generations of short-range wireless communication (for example, Wi-Fi 4, Wi-Fi 5, Wi-Fi 6, Wi-Fi6e, or Wi-Fi 7) supported by the external electronic device 320, channel bandwidth information, information indicating a maximum data rate, and/or information indicating a modulation and coding scheme (MCS).

The electronic device 310 may select one operation mode from among a plurality of operation modes of an interface (for example, the interface 313 of FIG. 3), based on the capability information of the external electronic device 320 in operation 620.

The electronic device 310 may receive the capability information of the external electronic device 320 and establish a channel to be connected to the external electronic device 320, based on the capability information of the external electronic device 320. When performing short-range wireless communication with the external electronic device 320, the electronic device 310 may determine configurations (for example, a frequency band, a channel, a maximum data rate, and/or a modulation and coding scheme (MCS) to perform short-range wireless communication) to be used for short-range wireless communication. According to an embodiment, the electronic device 310 may determine configurations to be used for short-range wireless communication, based on the capability information of the short-range wireless communication which can be supported by the electronic device 310 and the capability information of the external electronic device 320. The configurations to be used for short-range wireless communication may include a frequency band, a channel, a maximum data rate, and/or a modulation and coding scheme which can be supported by both the electronic device 310 and the external electronic device 320. According to an embodiment, the electronic device 310 may receive the configurations to be used by the external electronic device 320 for short-range wireless communication determined based on the capability information of the electronic device 310 and the capability information of the external electronic device 320.

The electronic device 310 may control the interface 313, based on the determined configurations to be used for short-range wireless communication. The electronic device 310 may identify a maximum data rate included in the determined configurations and select an operation mode in which the interface 313 operates based on the maximum data rate.

The electronic device 310 may select an operation mode supporting a data rate higher than the maximum data rate included in the determined configurations as the operation mode in which the interface 313 operates. For example, the electronic device 310 may select one operation mode from among the operation modes (for example, the second operation mode, the third operation mode, the fourth operation mode, and/or the fifth operation mode) supporting a data rate higher than the maximum data rate (for example, 3.5 Gbps) included in the determined configurations as the operation mode in which the interface 313 operates. The electronic device 310 may prevent and/or reduce the bottleneck phenomenon and reduce power consumption by selecting, as the operation mode in which the interface 313 operates, an operation mode (for example, the second operation mode) having the lowest maximum data rate from among the operation modes supporting the data rate higher than the maximum data rate included in the determined configurations.

The electronic device 310 may activate the selected operation mode and transmit and/or receive data through the selected operation mode in operation 630.

Figure 7:
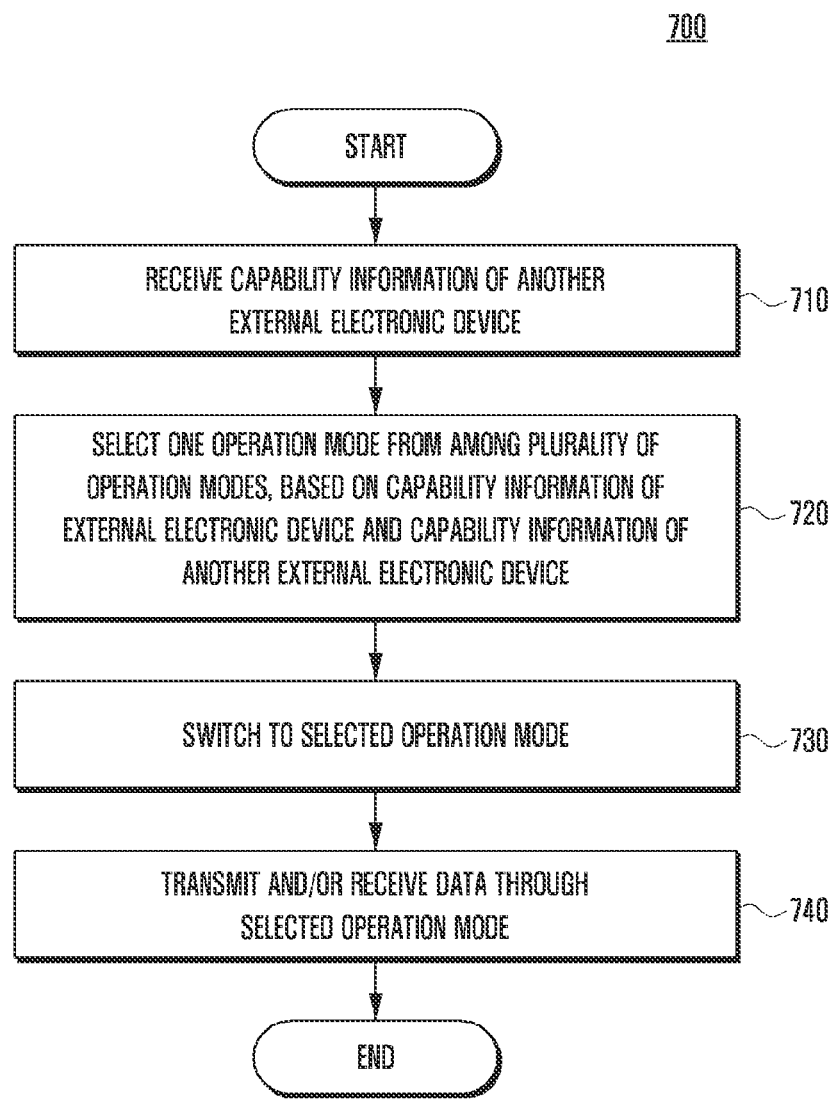
FIG. 7 is a flowchart illustrating an example method of operating an electronic device according to various embodiments.

FIG. 7 is a flowchart illustrating an example method of operating an electronic device according to various embodiments.

An electronic device (for example, the electronic device 310 of FIG. 4) may receive capability information of an external electronic device (for example, the external electronic device 320 of FIG. 3).

According to various embodiments of the disclosure, as a portion of the operation for establishing a channel to exchange data with the external electronic device 320, the electronic device 310 may receive capability information of the external electronic device 320. The electronic device 310 may transmit a channel generation request message (for example, a beacon message related to short-range wireless communication or a probe response message corresponding to a response message corresponding to a probe message transmitted by the external electronic device 320) to the external electronic device 320. The external electronic device 320 may receive the channel generation request message from the electronic device and transmit a response message including the capability information of the external electronic device 320 to the electronic device.

The capability information of the external electronic device 320 may include capability information related to short-range wireless communication supported by the external electronic device 320. For example, the capability information of the external electronic device 320 may include information on generations of short-range wireless communication (for example, Wi-Fi 4, Wi-Fi 5, Wi-Fi 6, Wi-Fi6e, or Wi-Fi 7) supported by the external electronic device 320, channel bandwidth information, information indicating a maximum data rate, and/or information indicating a modulation and coding scheme (MCS).

The electronic device 310 may select one operation mode from among a plurality of operation modes of an interface (for example, the interface 313 of FIG. 3), based on the capability information of the external electronic device 320. The electronic device 310 may select one operation mode from among the operation modes (for example, the second operation mode, the third operation mode, the fourth operation mode, and/or the fifth operation mode) supporting a data rate higher than the maximum data rate (for example, 3.5 Gbps) to perform short-range wireless communication as the operation mode in which the interface 313 operates. In FIG. 7, it is assumed that the interface 313 is configured as the second operation mode for convenience of description.

The electronic device 310 may support various wireless communication modes defined in short-range wireless communication. Various wireless communication modes may include a station (STA) mode in which the electronic device 310 receives or transmit data from or to various external electronic devices via the external electronic device 320, a peer-to-peer (P2P) mode (or a Wi-Fi direct mode) in which the electronic device 310 is directly connected to an external electronic device (for example, the external electronic device 102 of FIG. 1) and exchanges data, and/or a mobile hot-spot (MHS) mode in which the electronic device 310 serves as an access point (AP). In the state in which the electronic device 310 is connected to the external electronic device 320 through the STA mode), the electronic device 310 may be connected to another external electronic device (for example, the external electronic device 102 of FIG. 1) through another mode (for example, the P2P mode and/or the MHS mode) as various wireless communication modes are simultaneously supported.

The electronic device 310 may determine (or switch) the operation mode of the interface 313, based on capability information of a plurality of external electronic devices while being connected with the plurality of external electronic devices.

The electronic device (for example, the electronic device 310 of FIG. 4) may receive capability information of another external electronic device (for example, the electronic device 102 of FIG. 1) in operation 710.

The electronic device 310 may receive the capability information of the other external electronic device 102 while being connected with the external electronic device 320 through short-range wireless communication.

The electronic device 310 may detect the connection with the external electronic device (for example, the external electronic device 102 of FIG. 1) through short-range wireless communication while being connected with the external electronic device 320. The electronic device 310 may make a request for and receive the capability information of the other external electronic device 102 according to detection of the connection with the other external electronic device 102 through short-range wireless communication. The capability information of the other external electronic device 102 may be capability information related to short-range wireless communication supported by the other external electronic device 102. For example, the capability information of another external electronic device 102 may include information on generations of short-range wireless communication (for example, Wi-Fi 4, Wi-Fi 5, Wi-Fi 6, Wi-Fi6e, or Wi-Fi 7) supported by the other external electronic device 102, channel bandwidth information, information indicating a maximum data rate, and/or information indicating a modulation and coding scheme (MCS).

The electronic device 310 may receive the capability information of the other external electronic device 102 and establish a channel to be connected with the other external electronic device 102, based on the capability information of the other external electronic device 102. When performing short-range wireless communication with the other external electronic device 102, the electronic device 310 may determine configurations (for example, a frequency band, a channel, a maximum data rate, and/or a modulation and coding scheme (MCS) to perform short-range wireless communication) to be used for short-range wireless communication. According to an embodiment, the electronic device 310 may determine configurations to be used for short-range wireless communication, based on capability information of short-range wireless communication which can be supported by the electronic device 310 and the capability information of the other external electronic device 102. The configurations to be used for short-range wireless communication may include a frequency band, a channel, a maximum data rate, and/or a modulation and coding scheme which can be supported by both the electronic device 310 and the other external electronic device 102. According to an embodiment, the electronic device 310 may receive configurations to be used for short-range wireless communication to be used by the other external electronic device 102 for short-range wireless communication determined based on capability information of the electronic device 310 and the capability information of the other external electronic device 102.

The electronic device 310 may select one operation mode from among a plurality of operation modes of an interface (for example, the interface 313 of FIG. 3), based on the capability information of the external electronic device 320 and/or the capability information of the other external electronic device 102 in operation 720.

The electronic device 310 may control the interface 313, based on the determined configurations to be used for short-range wireless communication. The electronic device 310 may identify a maximum data rate included in the determined configurations and select an operation mode in which the interface 313 operates based on the maximum data rate.

The electronic device 310 may select an operation mode in which the interface 313 operates based on the capability information of the external electronic device 320 and the capability information of the other external electronic device 102. The electronic device 310 may select an operation mode supporting a data rate higher than a larger value between the maximum data rate of the channel connected between the external electronic device 320 and the electronic device 310 and the maximum data rate of the channel connected between the other external electronic device 102 and the electronic device 310 as the operation mode in which the interface 313 operates. For example, the electronic device 310 may select an operation mode (for example, the fourth operation mode or the fifth operation mode) supporting a data rate (for example, 16 Gbps or 32 GBps) higher than a larger value between the maximum data rate (for example, 3.5 Gbps) of the channel connected between the external electronic device 320 and the electronic device 310 and the maximum data rate (for example, 9.6 Gbps) of the channel connected between the other external electronic device 102 and the electronic device 310 as the operation mode in which the interface 313 operates. The electronic device 310 may prevent and/or reduce the bottleneck phenomenon and reduce power consumption by selecting an operation mode (for example, the fourth operation mode) having the lowest maximum data rate from among the operation modes supporting a data rate higher than the larger data rate as the operation mode in which the interface 313 operates.

The electronic device 310 may switch the operation mode of the interface 313 to the selected operation mode in response to the operation mode of the interface 313 being different from the selected operation mode in operation 730.

For example, the electronic device 310 may control the interface 313 to switch to the fourth operation mode determined based on the capability information of the external electronic device 320 and the capability information of the other external electronic device 102 in the second mode determined based on the capability information of the external electronic device 320.

The electronic device 310 may switch a state of the interface 313 from an active state (for example, L0, L0s, or L1) to a recovery state and control the interface 313 to change the operation mode in the recovery state.

The electronic device 310 may activate the selected operation mode and transmit and/or receive data through the selected operation mode in operation 740.

A method of operating an electronic device (for example, the electronic device 310 of FIG. 4) according to various example embodiments of the disclosure may include: \selecting one operation mode from among a plurality of operation modes supported by an interface (for example, the interface 313 of FIG. 4) between an application processor (for example, the application 311 of FIG. 4) and a communication module (for example, the communication module 312 of FIG. 4), based on capability information of an external electronic device (for example, the external electronic device 320 of FIG. 3) received from the external electronic device and transmitting data to the application processor through the interface operating in the selected operation mode or receiving data transmitted by the application processor through the interface, wherein the capability information of the external electronic device is received from the external electronic device before establishment of short-range wireless communication is completed.

In the method of operating the electronic device according to various example embodiments of the disclosure, the capability information of the external electronic device may include frequency band information of a channel related to the short-range wireless communication, data rate information related to data exchanged through the short-range wireless communication, and/or modulation and coding scheme (MCS) information related to the data.

In the method of operating the electronic device according to various example embodiments of the disclosure, the capability information of the external electronic device may be included in a message received during a process of generating a channel between the external electronic device and the electronic device.

In the method of operating the electronic device according to various example embodiments of the disclosure, the selecting the one operation mode from among the plurality of operation modes may include selecting an operation mode corresponding to a data rate higher than a maximum data rate transmitted through the channel.

The method of operating the electronic device according to various example embodiments of the disclosure may further include receiving capability information of another external electronic device (for example, the electronic device 102 of FIG. 1) to be connected through the short-range wireless communication and selecting one operation mode from among the plurality of operation modes, based on the capability information of the external electronic device and the other external electronic device.

In the method of operating the electronic device according to various example embodiments of the disclosure, the selecting the one operation mode from among the plurality of operation modes may include selecting an operation mode supporting a data rate higher than a larger data rate between a maximum data rate of data transmitted by the external electronic device and a maximum data rate of data transmitted by the other external electronic device.

The method of operating the electronic device according to various example embodiments of the disclosure may further include activating the selected operation mode through a recovery state of the connected interface in response to identification that an operation of the interface is different from the selected operation mode.

The method of operating the electronic device according to various example embodiments of the disclosure may further include selecting one of channels supported by the external electronic device, based on a capability of an interface connected between the communication module and the application processor and making a connection with the external electronic device through the selected channel.

In the method of operating the electronic device according to various example embodiments of the disclosure, the plurality of interfaces may include a peripheral component interconnect interface express (PCIe).

The method of operating the electronic device according to various example embodiments of the disclosure may further include completing a connection between the communication module and the application through the selected operation mode until a channel is generated.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication module comprising communication circuitry configured to support short-range wireless communication and at least one processor comprising processing circuitry; and
at least one application processor, comprising processing circuitry, electrically connected to the communication module through an interface configured to support a plurality of operation modes,
wherein at least one processor, individually or collectively, is configured to:
receive, while establishing the short-range wireless communication with an external electronic device, capability information of the external electronic device, the capability information of the external electronic device being related to the short-range wireless communication supported by the external electronic device;
determine configurations of the short-range wireless communication based on the capability information of the external electronic device;
select one operation mode from among the plurality of operation modes, based on the determined configurations;
control the interface to activate the selected operation mode before the establishment of a channel of the short-range wireless communication is completed;
establish a channel of the short-range wireless communication for transmitting data different from data for establishment of the channel; and
transmit the data to the application processor through the interface operating in the selected operation mode and/or receive data transmitted by the application processor through the interface.

2. The electronic device of claim 1, wherein the capability information of the external electronic device comprises frequency band information of a channel related to the short-range wireless communication, data rate information related to data exchanged through the short-range wireless communication, and/or modulation and coding scheme (MCS) information related to the data.

3. The electronic device of claim 1, wherein the capability information of the external electronic device is included in a message received during generating a channel between the external electronic device and the electronic device.

4. The electronic device of claim 1, wherein at least one processor comprising processing circuitry is configured individually or collectively to select an operation mode of an interface corresponding to a data rate higher than a maximum data rate transmitted through a channel.

5. The electronic device of claim 1, wherein at least one processor comprising processing circuitry, individually and/or collectively, is configured to:
receive capability information of another external electronic device to be connected through the short-range wireless communication; and
select one operation mode from among the plurality of operation modes, based on the capability information of the external electronic device and the another external electronic device.

6. The electronic device of claim 5, wherein at least one processor comprising processing circuitry, individually and/or collectively, is configured to select an operation mode supporting a data rate higher than a larger data rate between a maximum data rate of data transmitted by the external electronic device and a maximum data rate of data transmitted by the another external electronic device.

7. The electronic device of claim 1, wherein at least one processor comprising processing circuitry, individually and/or collectively, is configured to activate the selected operation mode through a recovery state of the connected interface in response to identification that an operation of the interface is different from the selected operation mode.

8. The electronic device of claim 1, wherein at least one processor comprising processing circuitry, individually and/or collectively, is configured to:
select one of channels supported by the external electronic device, based on a capability of an interface connected between the communication module and the application processor; and make a connection with the external electronic device through the selected channel.

9. The electronic device of claim 1, wherein the interface includes a peripheral component interconnect interface express (PCIe).

10. The electronic device of claim 1, wherein at least one processor comprising processing circuitry, individually and/or collectively, is configured to complete a connection between the communication module and the application processor through the selected operation mode until a channel is generated.

11. A method of operating an electronic device, the method comprising:
receiving, while establishing short-range wireless communication with an external electronic device, capability information of the external electronic device, the capability information of the external electronic device being related to the short-range wireless communication supported by the external electronic device;
determining configurations of the short-range wireless communication based on the capability information of the external electronic device;
selecting one operation mode from among a plurality of operation modes supported by an interface between an application processor and a communication module, based on the determined configurations;
controlling the interface to activate the selected operation mode before the establishment of the short-range wireless communication is completed;
establishing a channel of the short-range wireless communication for transmitting data different from data for establishment of the channel; and
transmitting data to the application processor through an interface operating in the selected operation mode and/or receiving data transmitted by the application processor through the interface.

12. The method of claim 11, wherein the capability information of the external electronic device comprises frequency band information of a channel related to the short-range wireless communication, data rate information related to data exchanged through the short-range wireless communication, and/or modulation and coding scheme (MCS) information related to the data.

13. The method of claim 11, wherein the capability information of the external electronic device is included in a message received during a process of generating a channel between the external electronic device and the electronic device.

14. The method of claim 11, wherein the selecting of the one operation mode from among the plurality of operation modes comprises selecting an operation mode corresponding to a data rate higher than a maximum data rate transmitted through a channel.

15. The method of claim 11, further comprising:
receiving capability information of another external electronic device to be connected through the short-range wireless communication; and
selecting one operation mode from among the plurality of operation modes, based on the capability information of the external electronic device and the another external electronic device.

16. The method of claim 15, wherein the selecting of the one operation mode from among the plurality of operation modes comprises selecting an operation mode supporting a data rate higher than a larger data rate between a maximum data rate of data transmitted by the external electronic device and a maximum data rate of data transmitted by the another external electronic device.

17. The method of claim 11, further comprising activating the selected operation mode through a recovery state of the connected interface in response to identification that an operation of the interface is different from the selected operation mode.

18. The method of claim 11, further comprising:
selecting one of channels supported by the external electronic device, based on a capability of an interface connected between the communication module and the application processor; and
making a connection with the external electronic device through the selected channel.

19. The method of claim 11, wherein a plurality of interfaces include a peripheral component interconnect interface express (PCIe).

20. The method of claim 11, further comprising completing a connection between the communication module and the application processor through the selected operation mode until a channel is generated.

* * * * *